(12) United States Patent
Tanaka (10) Patent No.: US 12,166,180 B2
(45) Date of Patent: Dec. 10, 2024

(54) ALL-SOLID BATTERY (71) Applicant: TDK CORPORATION, Tokyo (JP)

(72) Inventor: Kazumasa Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 720 days.

(21) Appl. No.: 17/418,483

(22) PCT Filed: Jan. 6, 2020

(86) PCT No.: PCT/JP2020/000035
§ 371 (c)(1),
(2) Date: Jun. 25, 2021

(87) PCT Pub. No.: WO2020/145226
PCT Pub. Date: Jul. 16, 2020

(65) Prior Publication Data
US 2022/0077501 A1    Mar. 10, 2022

(30) Foreign Application Priority Data
Jan. 10, 2019 (JP) .................................. 2019-002251

(51) Int. Cl.
*H01M 10/0585* (2010.01)
*H01M 50/11* (2021.01)
(Continued)

(52) U.S. Cl.
CPC ....... *H01M 10/0585* (2013.01); *H01M 50/11* (2021.01); *H01M 50/533* (2021.01);
(Continued)

(58) Field of Classification Search
CPC . H01M 10/0585; H01M 50/11; H01M 50/533
See application file for complete search history.

(56) References Cited

U.S. PATENT DOCUMENTS

2016/0133917 A1\* 5/2016 Choi ................... H01M 4/0404
429/162
2020/0020974 A1\* 1/2020 Shimizu ............ H01M 10/0525

FOREIGN PATENT DOCUMENTS

JP          2016-207540 A    12/2016
WO    WO-2018203474 A1 \*  11/2018   ........ H01M 10/0525

OTHER PUBLICATIONS

Mar. 31, 2020 International Search Report issued in International Patent Application No. PCT/JP2020/000035.

\* cited by examiner

*Primary Examiner* — James M Erwin
*Assistant Examiner* — Zackary Richard Cochenour
(74) *Attorney, Agent, or Firm* — Oliff PLC (57) ABSTRACT

This all-solid-state battery includes: a laminate; a positive electrode-side external electrode; and a negative electrode-side external electrode, in which the laminate includes a positive electrode layer and a negative electrode layer, in a plan view from a lamination direction of the laminate, the positive electrode layer includes a positive electrode main portion and a positive electrode auxiliary portion which protrudes from the positive electrode main portion and reaches a side surface, the negative electrode layer includes a negative electrode main portion and a negative electrode auxiliary portion which protrudes from the negative electrode main portion and reaches the side surface, and a length $L_1$ of the positive electrode auxiliary portion on the side surface, a length $L_2$ of the negative electrode auxiliary portion on the side surface, and a length $L_3$ on the side surface satisfy a relation of $20 \ \mu m \leq (L_1+L_2) < L_3$ (1).

17 Claims, 6 Drawing Sheets

(51) Int. Cl.
*H01M 50/533* (2021.01)
*H01M 50/54* (2021.01)
*H01M 50/548* (2021.01)
*H01M 50/553* (2021.01)
*H01M 10/0562* (2010.01)

(52) U.S. Cl.
CPC ......... *H01M 50/54* (2021.01); *H01M 50/548* (2021.01); *H01M 50/553* (2021.01)

ALL-SOLID BATTERY

TECHNICAL FIELD

The present invention relates to an all-solid-state battery. Priority is claimed on Japanese Patent Application No. 2019-002251, filed Jan. 10, 2019, the content of which is incorporated herein by reference.

BACKGROUND ART

In recent years, the development of electronics technology has been remarkable, and portable electronic devices have been made smaller, lighter, thinner, and multifunctional. Accordingly, there is a strong demand for batteries being power sources for electronic devices to be smaller, lighter, thinner, and more reliable.

Currently, in lithium ion secondary batteries that are widely used, electrolytes (electrolytic solutions) such as organic solvents have been used as medium for transferring ions in the related art. However, batteries containing electrolytic solutions have risks such as leakage thereof. In addition, since organic solvents used in electrolytic solutions are flammable, batteries having a higher degree of safety have been required.

As one measure for improving the safety of batteries, it has been proposed to use solid electrolytes as electrolytes instead of electrolytic solutions. All-solid-state batteries in which solid electrolytes are used as electrolytes and other components are also solids have been developed.

In general, all-solid-state batteries are classified into two types, a thin film type and a bulk type. Thin film types are produced through thin film technology such as a PVD method or a sol-gel method. Bulk types are produced through powder molding of an active material or a sulfide solid electrolyte having low grain boundary resistance. Thin film types have problems in that it is difficult to thicken active materials or to have a high degree of lamination, the capacity is small, and the production costs are high. Since sulfide solid electrolytes are used in bulk types, when they react with water, hydrogen sulfide is generated. Since it is difficult to handle bulk types in atmospheric air, it is necessary for bulk types to be produced in a glove box of which a dew point is managed. Accordingly, bulk types have a problem in that the safety and the production environment are limited.

In addition, there are also laminated all-solid-state batteries in which oxide-based solid electrolytes which are chemically stable in atmospheric air are used. For example, Patent Literature 1 discloses a method for producing a bulk firing-type highly-multilayered all-solid-state lithium ion secondary battery, the method including (a) a step of forming a laminate, (b) a step of pressing the formed laminate, and (c) a step of firing the pressed laminate. In the all-solid-state battery disclosed in Patent Literature 1, a plurality of negative electrodes consisting of a negative electrode active material and a negative electrode current collector, positive electrodes consisting of a positive electrode active material and a positive electrode current collector, and solid electrolytes sandwiched between the negative electrodes and the positive electrodes are laminated.

In addition, a pair of external electrodes are formed at both ends of the all-solid-state battery so as to sandwich the laminate, and the pair of external electrodes are connected to a positive electrode or a negative electrode. In some cases, the connection surfaces between the external electrodes and a positive electrode or a negative electrode peel off due to expansion of the volume of an active material produced by a charge-discharge reaction. The peeling-off of the connection surfaces causes deterioration of cycle characteristics.

CITATION LIST

Patent Literature

Patent Document 1

Japanese Unexamined Patent Application, First Publication No. 2016-207540

SUMMARY OF INVENTION

Technical Problem

The present invention has been made to solve the above-described problems, and an object of the present invention is to provide an all-solid-state battery having excellent cycle characteristics by improving the bond-ability between external electrodes and a positive electrode layer or a negative electrode layer.

Solution to Problem

An all-solid-state battery according to one aspect of the present invention includes: a laminate; a positive electrode-side external electrode; and a negative electrode-side external electrode, in which the laminate includes a positive electrode layer, a negative electrode layer, and a solid electrolyte layer between the positive electrode layer and the negative electrode layer, the positive electrode-side external electrode is connected to the positive electrode layer on a positive electrode-side end surface of the laminate, the negative electrode-side external electrode is connected to the negative electrode layer on a negative electrode-side end surface of the laminate, the positive electrode layer includes a positive electrode main portion extending from the positive electrode-side end surface to the negative electrode-side end surface and a positive electrode auxiliary portion which protrudes from the positive electrode main portion along the positive electrode-side end surface and reaches a side surface intersecting the positive electrode-side end surface in a plan view from a lamination direction of the laminate, the negative electrode layer includes a negative electrode main portion extending from the negative electrode-side end surface to the positive electrode-side end surface and a negative electrode auxiliary portion which protrudes from the negative electrode main portion along the negative electrode-side end surface and reaches the side surface intersecting the positive electrode-side end surface from the negative electrode main portion in a plan view from a lamination direction of the laminate, and, when viewed in a plan view from the lamination direction, a length $L_1$ of the positive electrode auxiliary portion on the side surface, a length $L_2$ of the negative electrode auxiliary portion on the side surface, and a length La on the side surface satisfy a relation of 20 µm≤ $(L_1+L_2)<L_3$ (1).

According to such a configuration, a contact area between an external electrode and an electrode layer increases. The increase in contact area between an external electrode and an electrode layer curbs peeling off of the external electrode from a positive electrode layer or a negative electrode layer due to expansion of the volume of the positive electrode layer and the negative electrode layer due to a charge-discharge reaction. As a result, an all-solid-state battery having excellent cycle characteristics can be obtained. If the sum of a length $L_1$ of a positive electrode auxiliary portion on a side surface and a length $L_2$ of a negative electrode auxiliary portion on a side surface coincides with a length $L_3$ of a side surface of a laminate, external electrodes are short-circuited. On the other hand, if the sum of a length $L_1$ of a positive electrode auxiliary portion on a side surface and a length $L_2$ of a negative electrode auxiliary portion on a side surface is shorter than 20 µm, the bonding strength between an external electrode and an electrode layer is insufficient, and therefore, excellent cycle characteristics are unlikely to be obtained.

In the all-solid-state battery according to the above-described aspect, when viewed in a plan view from the lamination direction, a length $L_1$ of the positive electrode auxiliary portion on the side surface, a length $L_2$ of the negative electrode auxiliary portion on the side surface, and a length $L_3$ on the side surface may satisfy a relation of 60 µm≤$(L_1+L_2)$<$L_3$(2).

In the all-solid-state battery according to the above-described aspect, the length $L_1$ of the positive electrode auxiliary portion on the side surface may be the same as the length $L_2$ of the negative electrode auxiliary portion on the side surface.

According to such a configuration, expansion of the volume of the positive electrode layer and the negative electrode layer due to a charge-discharge reaction can be suitably suppressed.

In the all-solid-state battery according to the above-described aspect, the length $L_1$ of the positive electrode auxiliary portion on the side surface and the length $L_3$ on the side surface may satisfy $(L_3 \times 2\%) \leq L_1 \leq (L_3 \times 49\%)$ (3). In addition, in the all-solid-state battery according to the above-described aspect, the length $L_2$ of the negative electrode auxiliary portion on the side surface and the length $L_3$ on the side surface may satisfy $(L_3 \times 2\%) \leq L_2 \leq (L_3 \times 49\%)$ (4).

According to such a configuration, superior cycle characteristics can be obtained.

Advantageous Effects of Invention

According to the present invention, it is possible to provide an all-solid-state battery having excellent cycle characteristics.

DESCRIPTION OF EMBODIMENTS

Hereinafter, the all-solid-state battery of the present invention will be described in detail with appropriate reference to the drawings. In the drawings used in the following description, part that becomes a feature of the present invention is sometimes enlarged for convenience in order to allow the feature to be easily understood. Accordingly, the dimensional ratios of each constituent element and the like shown in the drawings are sometimes different from the actual ones. The materials, dimensions, and the like exemplified in the following description are merely examples, and the present invention is not limited thereto and can be implemented by being appropriately modified within the range that does not change the gist thereof.

First Embodiment

Figure 1:
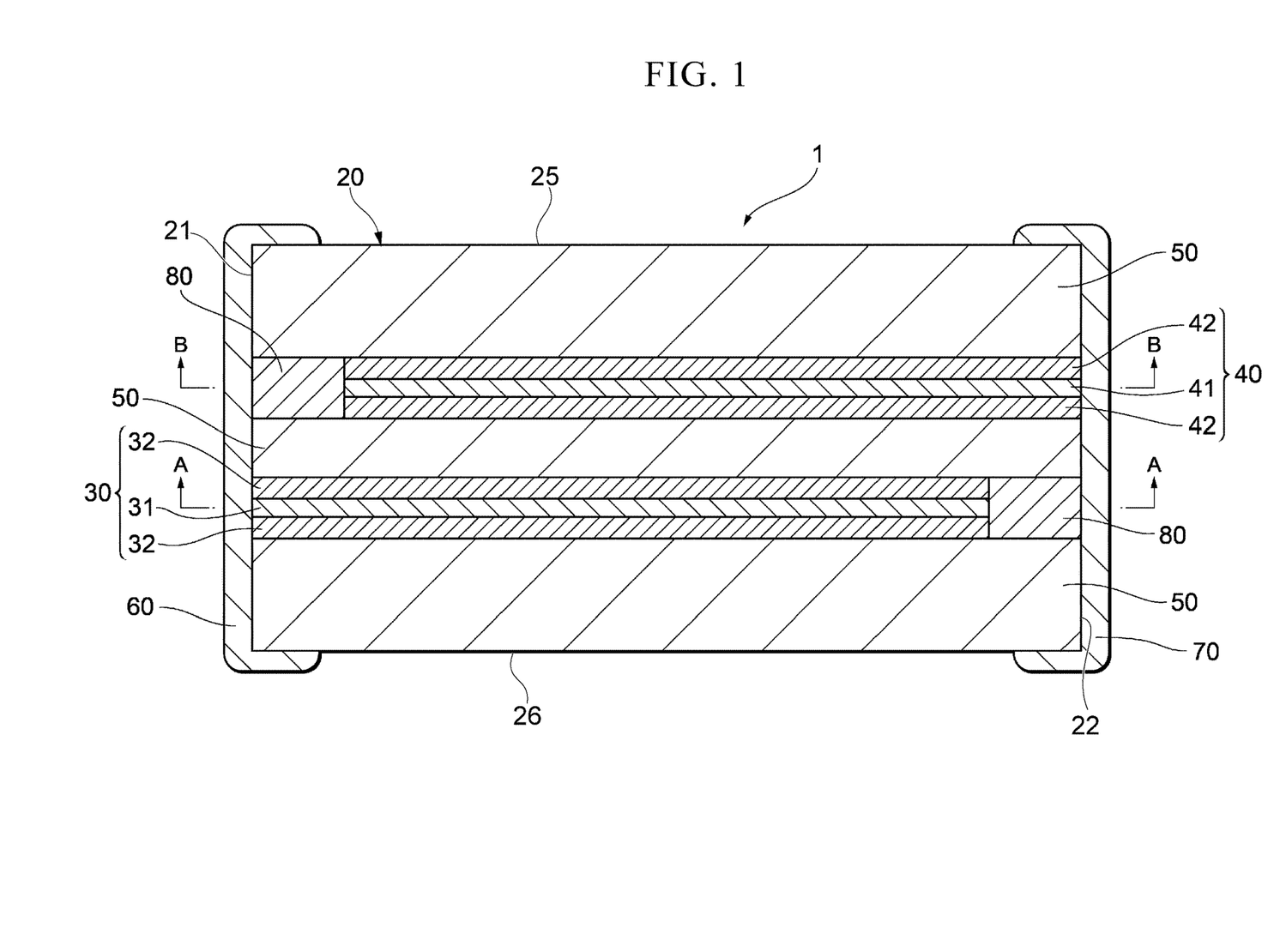
FIG. 1 shows a cross-sectional view of an all-solid-state battery of a first embodiment in a lamination direction.
Figure 2:
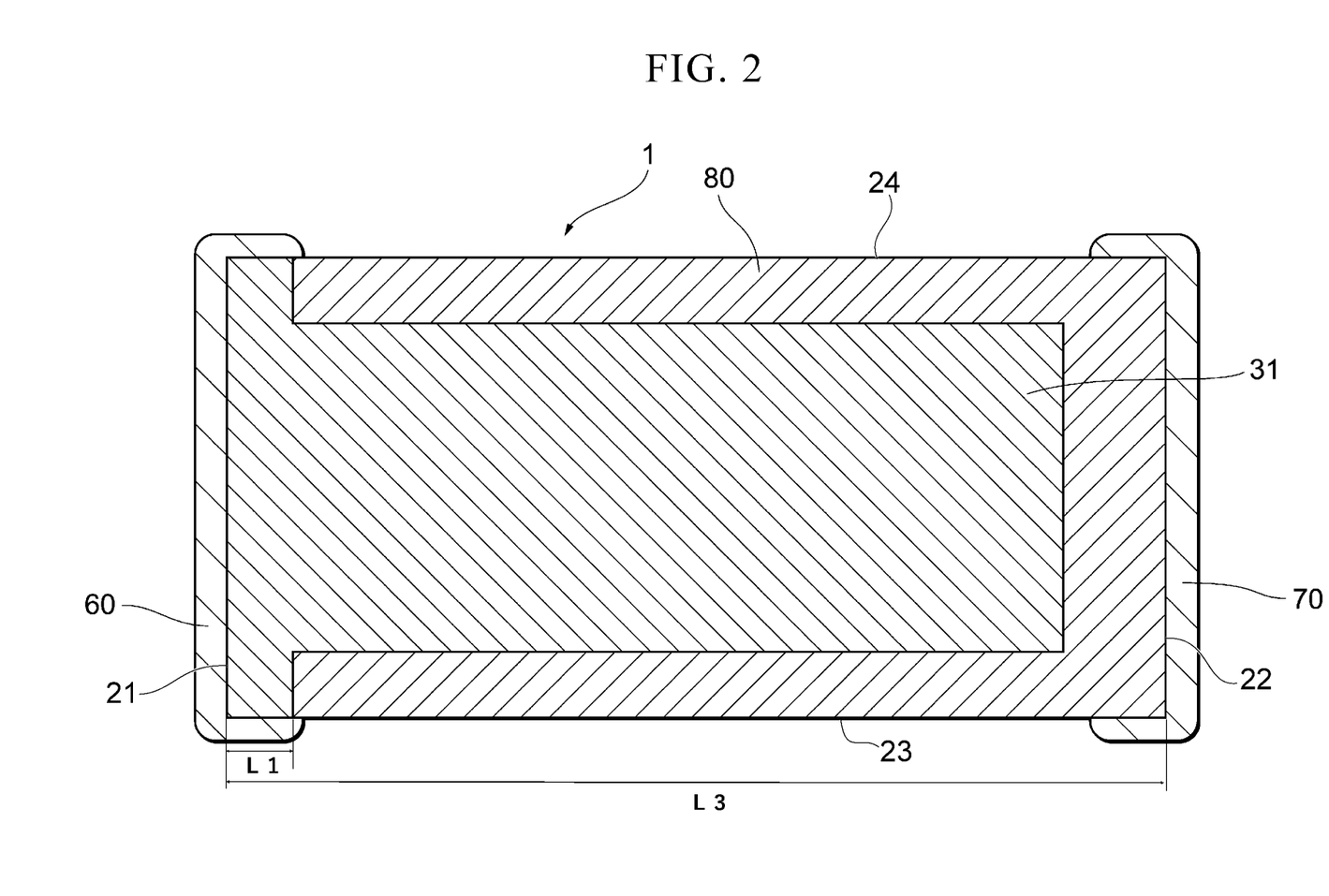
FIG. 2 shows a cross-sectional view taken along line A-A of FIG. 1.
Figure 3:
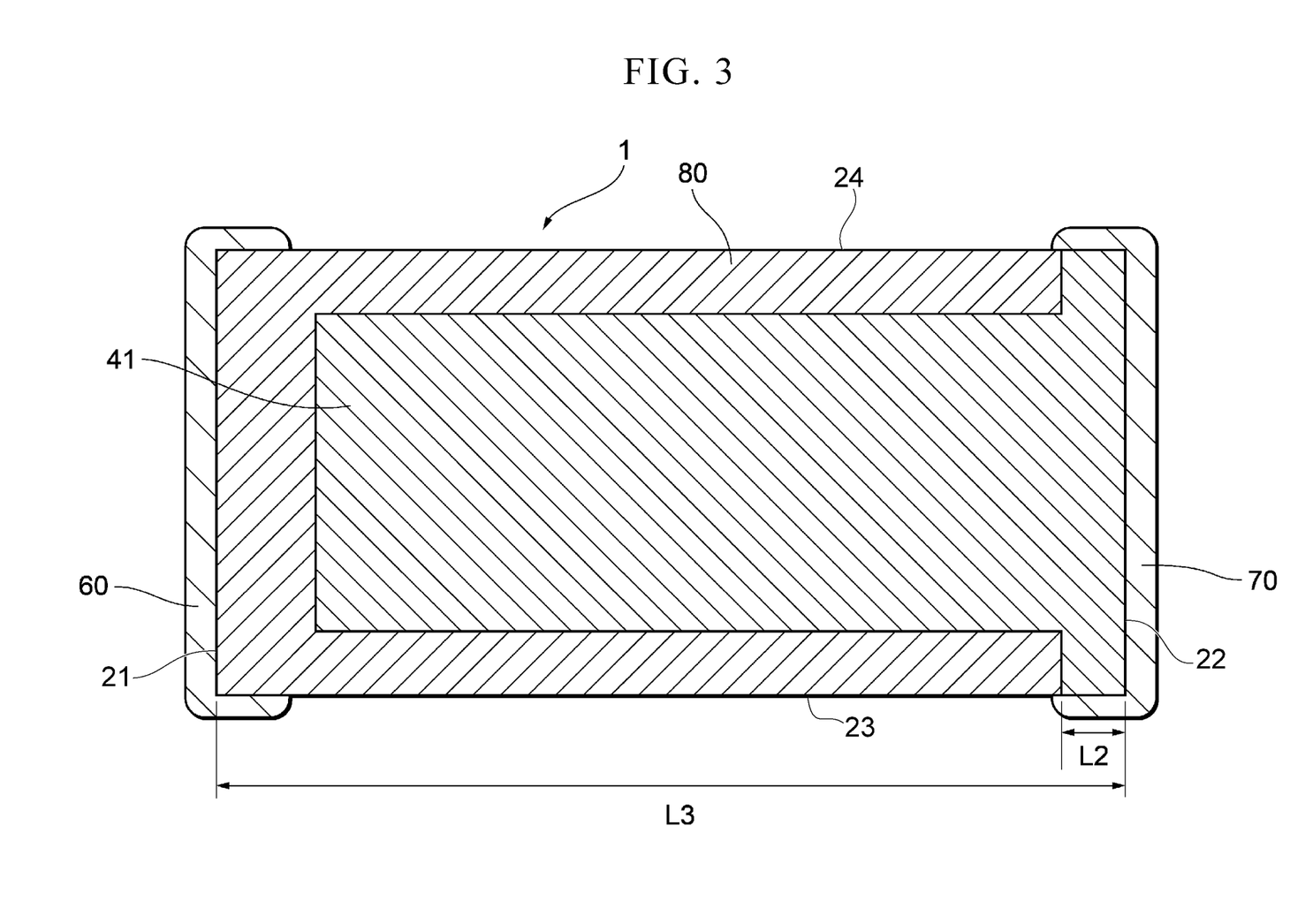
FIG. 3 shows a cross-sectional view taken along line B-B of FIG. 1.

First, an all-solid-state battery according to a first embodiment of the present invention will be described. FIG. 1 is a cross-sectional view of the all-solid-state battery of the first embodiment which is cut along a lamination direction. FIG. 2 is a cross-sectional view taken along line A-A of FIG. 1. FIG. 2 is a cross-sectional view obtained by cutting the all-solid-state battery along a positive electrode current collector layer 31. FIG. 3 is a cross-sectional view taken along line B-B of FIG. 1. FIG. 3 is a cross-sectional view obtained by cutting the all-solid-state battery along a negative electrode current collector layer 41.

As shown in FIG. 1, an all-solid-state battery 1 includes a laminate 20 in which a positive electrode 30, a negative electrode 40, and a solid electrolyte layer 50 are laminated. The solid electrolyte layer 50 is between the positive electrode 30 and the negative electrode 40 and also between the positive electrode 30 or the negative electrode 40 and an outer surface.

The positive electrode 30 includes the positive electrode current collector layer 31 and a positive electrode active material layer 32. The positive electrode active material layer 32 comes into contact with at least one surface of the positive electrode current collector layer 31. The negative electrode 40 includes the negative electrode current collector layer 41 and a negative electrode active material layer 42. The negative electrode active material layer 42 comes into contact with at least one surface of the negative electrode current collector layer 41. There are margin layers 80 in the same planes where the positive electrode 30 and the negative electrode 40 extend.

The laminate 20 is a hexahedron. The outer surface of the laminate is composed of a first end surface 21, a second end surface 22, a first side surface 23, a second side surface 24, an upper surface 25, and a lower surface 26.

The first end surface 21 and the second end surface 22 are surfaces which extend in the lamination direction and come into contact with a positive electrode-side external electrode 60 or a negative electrode-side external electrode 70 to be described below. The surface out of the first end surface 21 and the second end surface 22 which comes into contact with the positive electrode-side external electrode 60 is called a positive electrode-side end surface, and the surface coming into contact with the negative electrode-side external electrode 70 is called a negative electrode-side end surface.

The first side surface 23 and the second side surface 24 are surfaces which extend in the lamination direction and intersect the first end surface 21 and the second end surface 22. The upper surface 25 and the lower surface 26 are surfaces orthogonal to the lamination direction.

The positive electrode current collector layer 31 is exposed on the first end surface 21, and the negative electrode current collector layer 41 is exposed on the second end surface 22. The first side surface 23 is a side surface on a right side when viewed from the first end surface 21 side with the upper surface 25 facing upward, and the second side surface 24 is a side surface on a left side when viewed from the first end surface 21 with the upper surface 25 facing upward. The first end surface 21 and the second end surface 22 face each other, and the first side surface 23 and the second side surface 24 face each other. As will be described below, part of the positive electrode current collector layer 31 and the negative electrode current collector layer 41 is also exposed on the first side surface 23 and the second side surface 24.

The positive electrode-side external electrode 60 is electrically connected to the positive electrode current collector layer 31. The positive electrode-side external electrode 60 covers the first end surface 21 of the laminate 20. Since the positive electrode-side external electrode 60 is connected to the portion of the positive electrode current collector layer 31 to which the first end surface 21, the first side surface 23, and the second side surface 24 are exposed, the positive electrode current collector layer 31 is electrically connected to the positive electrode-side external electrode 60.

The negative electrode-side external electrode 70 is electrically connected to the negative electrode current collector layer 41. The negative electrode-side external electrode 70 covers the second end surface 22 of the laminate 20. Since the negative electrode-side external electrode 70 is connected to the portion of the negative electrode current collector layer 41 to which the second end surface 22, the first side surface 23, and the second side surface 24 are exposed, the negative electrode current collector layer 41 is electrically connected to the negative electrode-side external electrode 70.

In the present specification, in some cases, one or both of the positive electrode active material and the negative electrode active material are collectively called an active material, one or both of the positive electrode active material layer 32 and the negative electrode active material layer 42 are collectively called an active material layer, one or both of the positive electrode current collector layer 31 and the negative electrode current collector layer 41 are collectively called a current collector layer, one or both of the positive electrode 30 and the negative electrode 40 are collectively called an electrode layer, the first end surface 21 and the second end surface 22 are collectively called an end surface, the first side surface 23 and the second side surface 24 are collectively called a side surface, and the positive electrode-side external electrode 60 and the negative electrode-side external electrode 70 are collectively called an external electrode.

Figure 4:
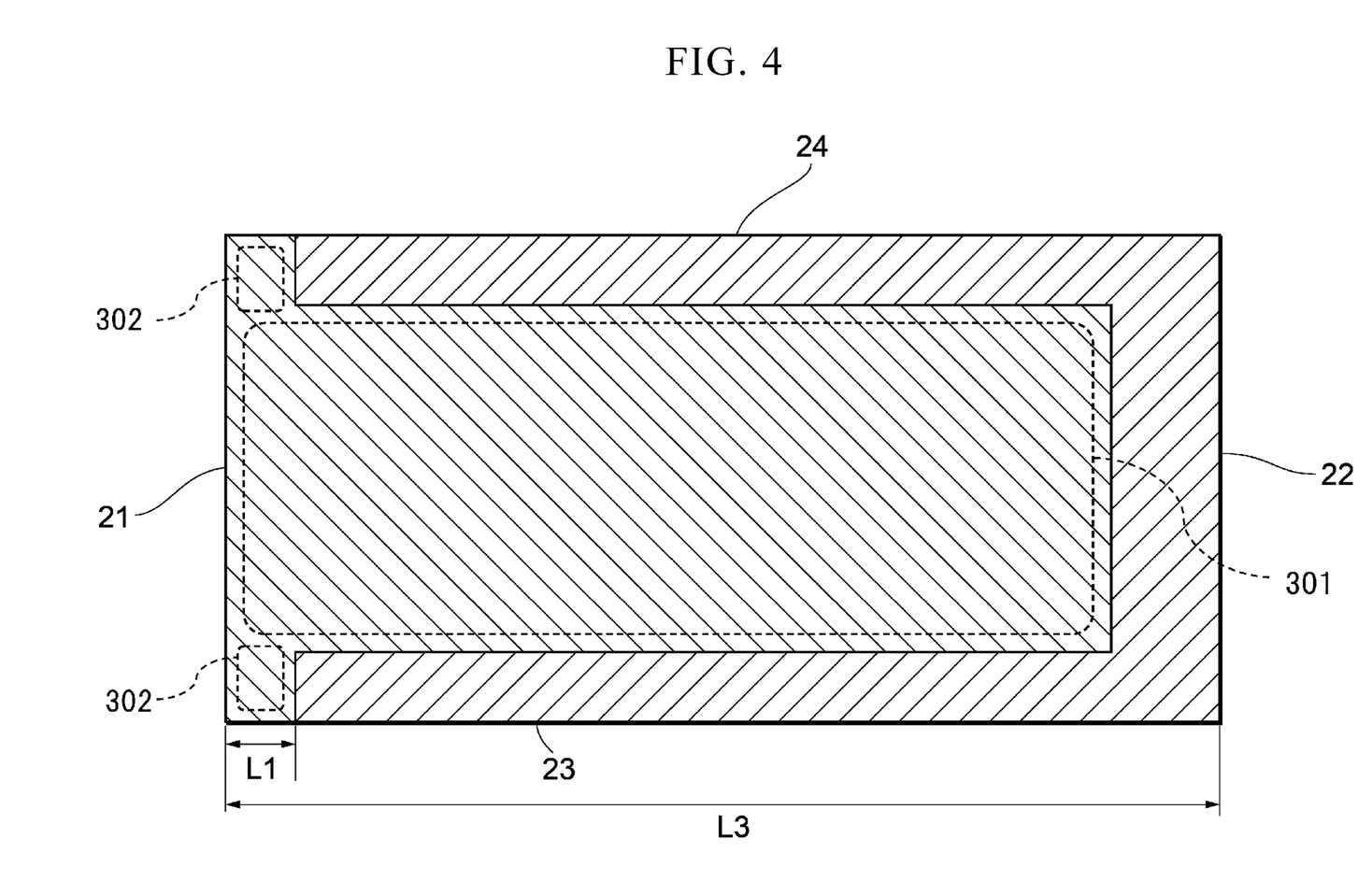
FIG. 4 shows a laminate 20 of the cross section of FIG. 2 in detail.

FIG. 4 is a cross-sectional view taken along line A-A of FIG. 1 and is a view in which only the laminate 20 is extracted. The positive electrode 30 is a layer extending in a plane. The positive electrode 30 includes a positive electrode main portion 301 and a positive electrode auxiliary portion 302 in a plan view from a lamination direction.

The positive electrode main portion 301 is a portion of the positive electrode 30 which extends from the first end surface 21 to the second end surface 22. The positive electrode main portion 301 is, for example, a rectangular region extending from the first end surface 21 to the second end surface 22. One side (positive electrode main end portion) of the positive electrode main portion 301 is exposed on the first end surface 21.

The positive electrode auxiliary portion 302 is a portion of the positive electrode 30 which protrudes from the positive electrode main portion 301 toward the first side surface 23 or the second side surface 24. The positive electrode auxiliary portion 302 is a rectangular region extending from the positive electrode main portion 301 toward the first side surface 23 or the second side surface 24, and there are two rectangular regions in FIG. 4. The positive electrode auxiliary portions 302 are exposed to part of the first end surface 21, part of the first side surface 23, or part of the second side surface 24. One side of one of the two positive electrode auxiliary portions 302 is exposed to part of the first end surface 21 and another side thereof is exposed to part of the first side surface 23. In addition, one side of the other of the two positive electrode auxiliary portions 302 is exposed to part of the first end surface 21 and another side thereof is exposed to part of the second side surface 24. The portions of the positive electrode auxiliary portions 302 which are exposed on the end surfaces and the side surfaces of the laminate are defined as positive electrode auxiliary end portions.

Figure 5:
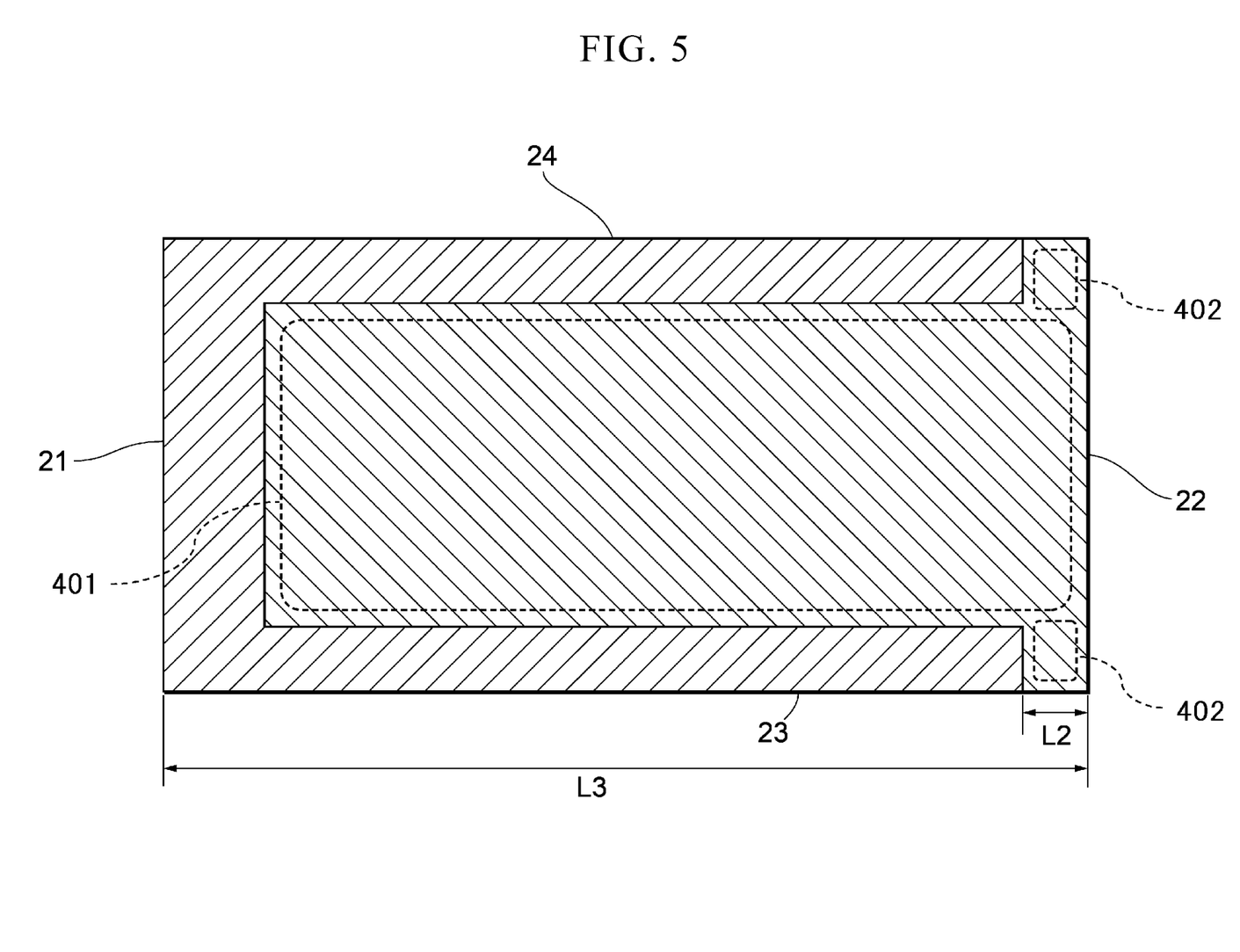
FIG. 5 shows a laminate 20 of the cross section of FIG. 3 in detail.

FIG. 5 is a cross-sectional view taken along line B-B of FIG. 1 and is a view in which only the laminate 20 is extracted. As shown in FIG. 5, similarly to the positive electrode 30, the negative electrode 40 also includes a negative electrode main portion 401 and a negative electrode auxiliary portion 402 in a plan view from the lamination direction.

The negative electrode main portion 401 is a portion of the negative electrode 40 which extends from the second end surface 22 to the first end surface 21. The negative electrode main portion 401 is, for example, a rectangular region extending from the second end surface 22 to the first end surface 21. One side (negative electrode main end portion) of the negative electrode main portion 401 is exposed on the second end surface 22.

The negative electrode auxiliary portion 402 is a portion of the positive negative electrode 40 which protrudes from the negative electrode main portion 401 toward the first side surface 23 or the second side surface 24. The negative electrode auxiliary portion 402 is a rectangular region extending from the negative electrode main portion 401 toward the first side surface 23 or the second side surface 24, and there are two rectangular regions in FIG. 5. The negative electrode auxiliary portions 402 are exposed to part of the second end surface 22, part of the first side surface 23, or part of the second side surface 24. One side of one of the two negative electrode auxiliary portions 402 is exposed to part of the second end surface 22 and another side thereof is exposed to part of the first side surface 23. In addition, one side of the other of the two negative electrode auxiliary portions 402 is exposed to part of the second end surface 22 and another side thereof is exposed to part of the second side surface 24. The portions of the negative electrode auxiliary portions 402 which are exposed on the end surfaces and the side surfaces of the laminate are defined as negative electrode auxiliary end portions.

Electrode layers in all-solid-state batteries in the related art are different from the electrode layers of the present embodiment in that the electrode layers in the related art are configured to include only the shapes corresponding to the positive electrode main portion 301 and the negative electrode main portion 401 of the present embodiment, whereas the electrode layers in the present embodiment also include the positive electrode auxiliary portions 302 and the negative electrode auxiliary portions 402. By having the positive electrode auxiliary portions 302 and the negative electrode auxiliary portions 402, the area of the electrode layers exposed on the end surfaces and the side surfaces of the laminate 20 increases. That is, since the area of the electrode layers exposed on the end surfaces and the side surfaces of the laminate 20 is increased compared to the all-solid-state batteries in the related art by the portion of the above-described positive electrode auxiliary end portions and the negative electrode auxiliary end portions, the contact area between the external electrodes and the electrode layers is increased. As a result, the external electrodes can be curbed from peeling off from the electrodes due to the expansion of the volume of the electrode layers due to a charge-discharge reaction. As a result, an all-solid-state battery having excellent cycle characteristics can be obtained.

As shown in FIGS. 4 and 5, when the length of a portion of the positive electrode auxiliary portions 302 which is exposed to a side surface (the first side surface 23 or the second side surface 24) is defined as $L_1$, the length of a portion of the negative electrode auxiliary portions 402 which is exposed to a side surface (the first side surface 23 or the second side surface 24) is defined as $L_2$, and the length of the first side surface 23 or the second side surface 24 is defined as $L_3$, it is set such that Expression (1) below is satisfied. Here, the lengths $L_1$, $L_2$, and La have a relation of the length on the same side surface between the first side surface 23 and the second side surface 24. In addition, all of these lengths are respectively lengths in a direction (first direction) parallel to the first side surface 23 in a plane orthogonal to the lamination direction.

$$20\ \mu m \leq (L_1+L_2) < L_3 \quad (1)$$

If ($L_1 + L_2$) has a length of less than 20 μm, the area of the electrode layers exposed to the laminate 20 is not sufficient and the contact area between the external electrodes and the electrode layers cannot be sufficiently secured. Therefore, it is difficult to obtain desired cycle characteristics.

In addition, it is more preferable that $L_1$ and $L_2$ be set so as to satisfy Expression (2) below.

$$60\ \mu m \leq (L_1+L_2) < L_3 \quad (2)$$

By setting ($L_1+L_2$) to be greater than or equal to 60 μm, the contact area can be more significantly increased as compared with setting ($L_1+L_2$) to be within a range of 20 to 59 μm and desired cycle characteristics are likely to be obtained.

Furthermore, it is preferable that $L_1$ satisfy Expression (3) below and $L_2$ satisfy Expression (4) below. In addition, it is more preferable that $L_1$ and $L_2$ satisfy both Expressions (3) and (4) below. If $L_1$ and $L_2$ satisfy Expressions (3) and (4), the cycle characteristics can be further enhanced.

$$(L_3 \times 2\%) \leq L_1 \leq (L_3 \times 49\%) \quad (3)$$

$$(L_3 \times 2\%) \leq L_2 \leq (L_3 \times 49\%) \quad (4)$$

In addition, $L_1$ and $L_2$ may satisfy Expression (5) below.

$$(L_3 \times 4\%) \leq L_1+L_2 \leq (L_3 \times 49\%) \quad (5)$$

If ($L_1+L_2$) has the same length as that of $L_3$, when the positive electrode-side external electrode 60 and the negative electrode-side external electrode 70 are formed in the laminate 20, there is a high possibility that they come into contact with each other. If the positive electrode-side external electrode 60 and the negative electrode-side external electrode 70 come into contact with each other, they will be short-circuited.

(Solid Electrolyte)

The solid electrolyte layer 50 of the all-solid-state battery 1 of the present embodiment contains a solid electrolyte material having low electron conductivity and high lithium ion conductivity. For example, a general solid electrolyte material such as an oxide-based lithium ion conductor having a NASICON type, garnet type, or perovskite type crystal structure can be used. The solid electrolyte layer 50 may be at least one selected from the group consisting of lithium aluminum titanium phosphate ($Li_{1+x}Al_xTi_{2-x}$(PO_4)_3$ ($0 \leq x \leq 0.6$)), $Li_{3+x1}Si_{x1}P_{1-x1}O_4$ ($0.4 \leq x1 \leq 0.6$), $Li_{3.4}V_{0.4}Ge_{0.6}O_4$, lithium germanium phosphate (LiGe$_2$(PO$_4$)$_3$), Li$_2$O—V$_2$O$_5$—SiO$_2$, Li$_2$O—P$_2$O$_5$—B$_2$O$_3$, Li$_3$PO$_4$, Li$_{0.5}$La$_{0.5}$TiO$_3$, Li$_{14}$Zn(GeO$_4$)$_4$, and Li$_7$La$_3$Zr$_2$O$_{12}$.

A lithium ion conductor having NASICON type crystal structure may be used as the solid electrolyte material of the present embodiment. A lithium ion conductor having a NASICON type crystal structure is represented by, for example, LiTi$_2$(PO$_4$)$_3$ (hereinafter, referred to as "LTP"), LiZr$_2$(PO$_4$)$_3$ (hereinafter, referred to as "LZP"), Li$_{1+x}$Al$_x$Ti$_{2-x}$(PO$_4$)$_3$ ($0<x\leq 0.6$, hereinafter, referred to as "LATP"), Li$_{1+x}$Al$_x$Ge$_{2-x}$(PO$_4$)$_3$ ($0<x\leq 0.6$, hereinafter, referred to as "LAGP"), and Li$_{1+x}$Y$_x$Zr$_{2-x}$(PO$_4$)$_3$ ($0<x\leq 0.6$, hereinafter, referred to as "LYZP".)

The solid electrolyte layer 50 may contain an active material used in the positive electrode 30 and the negative electrode 40. For example, the solid electrolyte layer 50 may contain the same element as that constituting an active material. If the solid electrolyte layer 50 contains the same element as that constituting an active material, bonding at interfaces between the positive electrode active material layer 32, the negative electrode active material layer 42, and the solid electrolyte layer 50 becomes strong.

The positive electrode active material layer 32 and the negative electrode active material layer 42 contain a positive electrode active material or a negative electrode active material which transfers lithium ions and electrons, respectively. In addition to these, the positive electrode active material layer 32 and the negative electrode active material layer 42 may contain a conductive assistant, an ion conductive assistant, or the like. Lithium ions are efficiently inserted or eliminated from a positive electrode active material and a negative electrode active material.

There is no clear distinction between active materials constituting the positive electrode active material layer 32 or the negative electrode active material layer 42. By comparing potentials of two kinds of compounds, a compound showing a nobler potential can be used as a positive electrode active material and a compound showing a baser potential can be used as a negative electrode active material. In addition, if a compound serves both lithium ion release and lithium ion occlusion at the same time, an identical compound may be used in the positive electrode active material layer 32 and the negative electrode active material layer 42. For this reason, the active materials will be collectively described below.

A transition metal oxide, a transition metal composite oxide, or the like can be used in the active materials. Examples of transition metal oxides and transition metal composite oxides include lithium-manganese composite oxides (Li$_2$Mn$_a$Ma$_{1-a}$O$_3$($0.8\leq a\leq 1$, Ma=Co, Ni)), lithium cobalt oxide (LiCoO$_2$), lithium nickel oxide (LiNiO$_2$), lithium manganese spinel (LiMn$_2$O$_4$), composite metal oxides represented by a general formula LiNi$_x$Co$_y$Mn$_z$O$_2$ ($x+y+z=1$, $0\leq x\leq 1$, $0\leq y\leq 1$, $0\leq z\leq 1$), lithium vanadium compounds (LiV$_2$O$_5$), olivine type LiMbPO$_4$ (however, Mb is one or more kinds of elements selected from Co, Ni, Mn, Fe, Mg, Nb, Ti, Al, and Zr), vanadium lithium phosphate (Li$_3$V$_2$(PO$_4$)$_3$ or LiVOPO$_4$), Li-excess solid solution positive electrodes represented by Li$_2$MnO$_3$—LiMcO$_2$ (Mc=Mn, Co, Ni), lithium titanate (Li$_4$Ti$_5$O$_{12}$), and composite metal oxides represented by Li$_s$Ni$_t$Co$_u$Al$_v$O$_2$ ($0.9<s<1.3$, $0.9<t+u+v<1.1$). In addition, metals, alloys, and metal oxides such as L$_1$ metal, Li—Al alloy, Li—In alloy, carbon, silicon (Si), silicon oxide (SiO$_x$), and titanium oxide (TiO$_2$) can be used in the active materials in addition to the above-described composite metal oxides.

As the active materials of the present embodiment, a phosphate compound is preferably contained as a main component. Examples of phosphate compounds may include one or a plurality of lithium vanadium phosphate ($LiVOPO_4$, $Li_3V_2(PO_4)_3$, $Li_4(VO)(PO_4)_2$), lithium vanadium pyrophosphate ($Li_2VOP_2O_7$, $Li_2VP_2O_7$), and $Li_9V_3(P_2O_7)_3(PO_4)_2$. In particular, one or both of $LiVOPO_4$ and $Li_3V_2(PO_4)_3$ are preferable.

A main component means that the ratio of phosphate compounds to all active materials in an active material layer is greater than 50 parts by mass, and the ratio of phosphate compounds thereto is preferably greater than or equal to 80 parts by mass.

In addition, in these active materials, part of each element may be substituted with a different element or may change from a stoichiometric composition. For example, $LiVOPO_4$ and $Li_3V_2(PO_4)_3$ preferably have a lithium deficiency, and $Li_xVOPO_4$ ($0.94 \leq x \leq 0.98$) or $Li_xV_2(PO_4)_3$ ($2.8 \leq x \leq 2.95$) is more preferable.

Examples of conductive assistants include: carbon materials such as carbon black, acetylene black, ketjen black, carbon nanotubes, graphite, graphene, and activated carbon; and metallic materials such as gold, silver, palladium, platinum, copper, and tin. Examples of ion conductive assistants include a solid electrolyte. As a specific example, the same materials as those used in the solid electrolyte layer 50 can be used as this solid electrolyte.

In a case where a solid electrolyte is used as an ion conductive assistant, an identical material is preferably used as the ion conductive assistant and the solid electrolyte used in the solid electrolyte layer 50.

(Positive Electrode Current Collector and Negative Electrode Current Collector)

Regarding materials constituting the positive electrode current collector layer 31 and the negative electrode current collector layer 41 of the all-solid-state battery 1 of the present embodiment, materials having large conductivity are preferably used. For example, silver, palladium, gold, platinum, aluminum, copper, and nickel are preferably used. In particular, copper is more preferable because copper is unlikely to react with lithium aluminum titanium phosphate and has an effect of reducing internal resistance of an all-solid-state battery. The materials constituting the positive electrode current collector layer 31 and the negative electrode current collector layer 41 may be the same as or different from the materials of the positive electrode and the negative electrode. In addition, the positive electrode current collector layer 31 and the negative electrode current collector layer 41 of the all-solid-state battery 1 of the present embodiment may respectively contain a positive electrode active material and a negative electrode active material.

If the positive electrode current collector layer 31 and the negative electrode current collector layer 41 respectively contain a positive electrode active material and a negative electrode active material, the adhesiveness between the positive electrode current collector layer 31 and the positive electrode active material layer 32 and between the negative electrode current collector layer 41 and the negative electrode active material layer 42 improve.

The proportion of the positive electrode active material or the negative electrode active material in the positive electrode current collector layer 31 or the negative electrode current collector layer 41 is not particularly limited as long as the collector layers can function as collectors, but the volume ratio of the positive electrode current collector to the positive electrode active material or the negative electrode current collector to the negative electrode active material is preferably within ranges of 90/10 to (Margin Layer)

The margin layers 80 of the all-solid-state battery 1 of the present embodiment fill, for example, portions other than the positive electrode 30 or the negative electrode 40 in the plane where the positive electrode 30 or the negative electrode 40 extends. The margin layers 80 of the all-solid-state battery 1 of the present embodiment are provided to eliminate the step between the solid electrolyte layer 50 and the positive electrode 30 and the step between the solid electrolyte layer 50 and the negative electrode 40. The margin layers 80 are provided, for example, in the same planes of the positive electrode 30 and the negative electrode 40. The margin layers 80 eliminate the step between the solid electrolyte layer 50 and the positive electrode 30 or the negative electrode 40. As a result, the denseness between the solid electrolyte layer 50 and the electrode layers is increased, and interlayer peeling (delamination) or warpage due to firing in a production process of an all-solid-state battery is unlikely to occur.

The margin layers 80 contain, for example, the same material as that of the solid electrolyte layer 50. The margin layers 80 are, for example, lithium ion conductors having a NASICON type crystal structure which is, for example, LTP, LZP, LATP, LAGP, or LYZP.

(Method for Producing all-Solid-State Battery)

The all-solid-state battery 1 of the present embodiment can be produced in the following procedure. Each material for the positive electrode current collector layer 31, the positive electrode active material layer 32, the solid electrolyte layer 50, the negative electrode current collector layer 41, the negative electrode active material layer 42, and the margin layer 80 is made into a paste. The method for making each material into a paste is not particularly limited, but examples thereof include a method for mixing powder of each of the materials with a vehicle to make a paste. Here, a vehicle is a generic term for a medium in a liquid phase and includes a solvent, a binder, and the like.

A binder contained in a paste for forming a green sheet or a printed layer is not particularly limited, but polyvinyl acetal resin, cellulose resin, acrylic resins, urethane resins, vinyl acetate resin, polyvinyl alcohol resin, or the like can be used, and at least one kind of these resins can be contained in a slurry.

In addition, a paste may contain a plasticizer. The type of plasticizer is not particularly limited, but phthalate esters such as dioctyl phthalate or diisononyl phthalate may be used.

By such a method, a paste for a positive electrode current collector layer, a paste for a positive electrode active material layer, a paste for a solid electrolyte layer, a paste for a negative electrode active material layer, a paste for a negative electrode current collector layer, and a paste for a margin layer are produced.

The paste for a solid electrolyte layer is applied on a polyethylene terephthalate (PET) base material or the like to a desired thickness and is dried as necessary to produce a green sheet for a solid electrolyte. The method for producing a green sheet for a solid electrolyte is not particularly limited, and a green sheet for a solid electrolyte can be produced through a well-known method with a doctor blade, a die coater, a comma coater, a gravure coater, or the like. Subsequently, the positive electrode active material layer 32, the positive electrode current collector layer 31, and the positive electrode active material layer 32 are printed and laminated on the green sheet for a solid electrolyte in this order through screen printing to form the positive electrode 30. Furthermore, in order to fill the step between the green sheet for a solid electrolyte and the positive electrode 30, the margin layer 80 is formed in a region other than the positive electrode layer through screen printing to produce a positive electrode layer unit.

A negative electrode layer unit can also be produced through the same method as the positive electrode layer unit. The negative electrode 40 and the margin layer 80 are formed on a green sheet for a solid electrolyte through screen printing to produce a negative electrode layer unit.

Then, the positive electrode layer unit and the negative electrode layer unit are alternately laminated such that one end of each unit are offset to not coincide with each other. Furthermore, outer layers (cover layers) may be provided on both main surfaces of the laminate as necessary. By laminating the outer layers, a laminated substrate including a plurality of elements of an all-solid-state battery is produced. The same material as that of the solid electrolyte can be used in the outer layers, and the green sheet for a solid electrolyte can be used.

While the production method is to produce a parallel type all-solid-state battery, a method of producing a serial type all-solid-state battery may be performed to laminate the positive electrode layer and the negative electrode layer such that respective one ends of both coincide with each other, while offset is not performed.

Furthermore, the produced laminated substrate can collectively pressed with a die press, a warm isostatic press (WIP), a cold isostatic press (CIP), a hydrostatic press, or the like to improve the adhesiveness. The pressurization is preferably performed while heating and can be performed, for example, at 40° C. to 95° C.

The produced laminated substrate is cut using a dicing device to obtain a laminate of a non-fired all-solid-state battery.

An all-solid-state battery is produced through debindering and firing of the laminate of the all-solid-state battery. The debindering and the firing can be performed at a temperature of 600° C. to 1,000° C. in a nitrogen atmosphere. The holding time for the debindering and the firing is, for example, 0.1 to 6 hours.

Furthermore, external electrodes are provided to efficiently draw currents from the laminate 20 of the all-solid-state battery 1. The positive electrode 30 and the negative electrode 40 are alternately connected to the external electrodes in parallel, and the external electrodes are bonded through the first end surface 21 and the second end surface 22 of the laminate 20 facing to each other and part of the two facing first side surface 23 and the second side surface 24. Accordingly, a pair of external electrodes are formed so as to sandwich end surfaces of the laminate 20. Examples of the method for forming external electrodes include a sputtering method, a screen printing method, or a dip-coating method. In the screen printing method and the dip-coating method, a paste for an external electrode which contains a metal powder, a resin, and a solvent is produced and is formed as an external electrode. Subsequently, a baking step for removing a solvent and plating treatment which is used for forming a terminal electrode on the surface of an external electrode are performed. On the other hand, in the sputtering method, since an external electrode and a terminal electrode can be directly formed, the baking step and the plating step are unnecessary.

In order to improve moisture resistance and impact resistance in the laminate of the all-solid-state battery 1, the laminate may be sealed in, for example, a coin cell. The sealing method is not particularly limited, and a fired laminate may be sealed with a resin, for example. In addition, the surrounding of the laminate may be coated or dip-coated with an insulator paste of $Al_2O_3$ which has insulating properties, and this insulation paste may be subjected to heat treatment for sealing.

Second Embodiment

Next, a laminated all-solid-state secondary battery according to a second embodiment of the present invention will be described. In the description of the second embodiment, the same configurations as those of the first embodiment which overlap each other will be denoted by the same reference numerals, and the description thereof will not be repeated.

Figure 6:
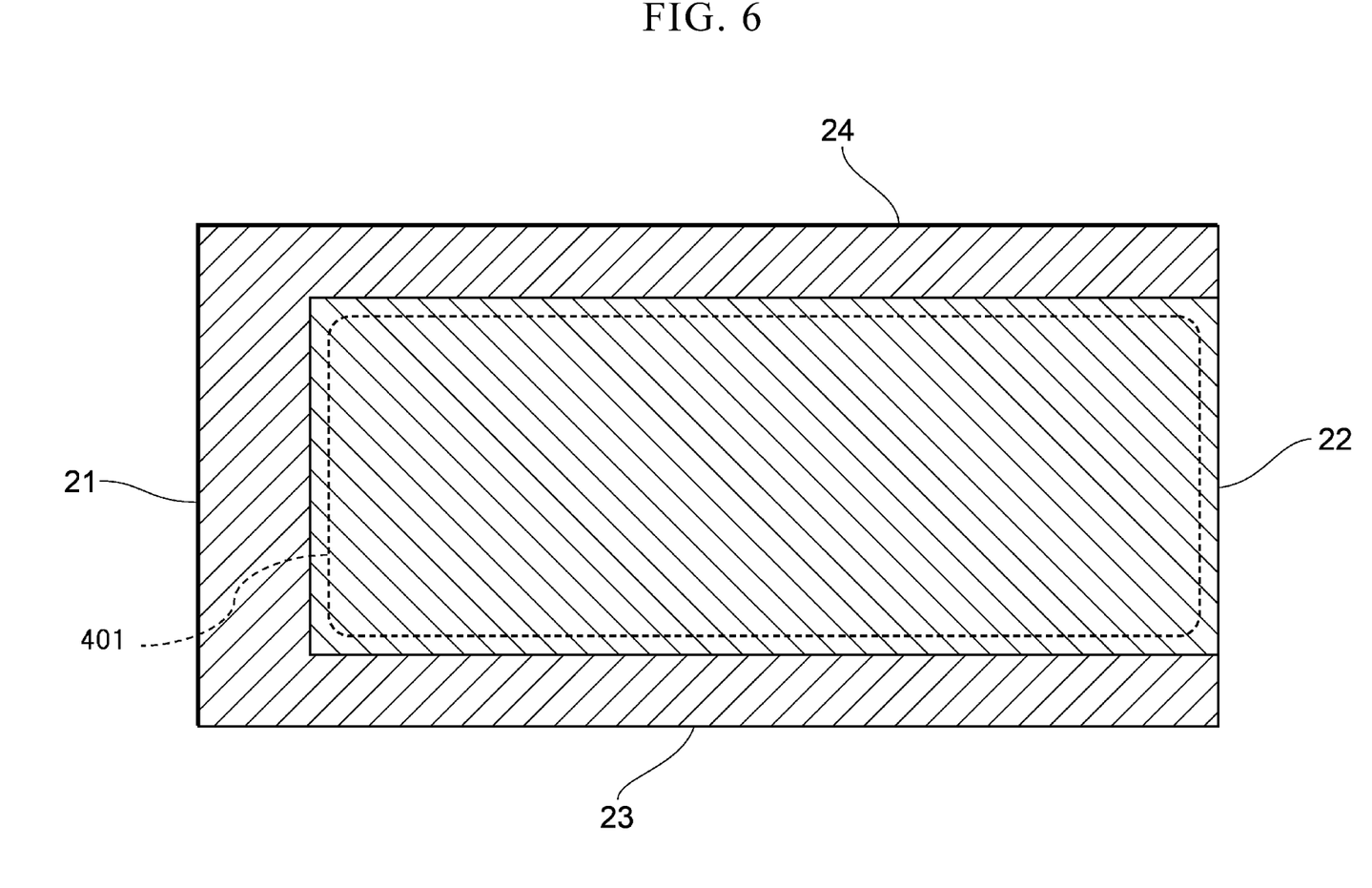
FIG. 6 shows a cross-sectional view of a laminate of an all-solid-state battery of a second embodiment.

FIG. 6 is a cross-sectional view of a laminate of the all-solid-state battery of the second embodiment which is cut along a negative electrode 40. The structure on a positive electrode 30 side of the all-solid-state battery according to the second embodiment is the same as that of the first embodiment, but the second embodiment is different from the first embodiment in that the negative electrode 40 does not have a negative electrode auxiliary portion 402 as shown in FIG. 6. Even with such a configuration, peeling-off between an external electrode and an electrode layer due to volume expansion can be suppressed similarly to the first embodiment. As a result, it is possible to provide an all-solid-state battery having excellent cycle characteristics. Although configuration in which a positive electrode 30 has a positive electrode auxiliary portion 302 but a negative electrode 40 does not have a negative electrode auxiliary portion 402 is exemplified in the present embodiment, the same effect can also be obtained even with a configuration in which a negative electrode 40 has a negative electrode auxiliary portion 402 but a positive electrode 30 does not have a positive electrode auxiliary portion 302.

Although the embodiments according to the present invention have been described in detail above, the invention is not limited to the embodiments and various modification can be made.

EXAMPLES

Hereinafter, the present invention will be described in more detail using examples and comparative examples based on the embodiments, the present invention is not limited to these examples. Unless otherwise specified, the indication of "parts" for the amount of a material incorporated during production of a paste means "parts by mass."

Example 1

(Production of Positive Electrode Active Material and Negative Electrode Active Material)

$Li_3V_2(PO_4)_3$ produced through the following method was used as a positive electrode active material and a negative electrode active material. Regarding the production method thereof, $Li_2CO_3$, $V_2O_5$, and $NH_4H_2PO_4$ were used as starting materials, wet-mixed with each other with a ball mill for 16 hours, and subjected to dehydration and drying. Thereafter, the powder was fired in a nitrogen-hydrogen mixed gas at 850° C. for 2 hours. The fired product was wet-pulverized with a ball mill and was then subjected to dehydration and drying to obtain positive electrode active material powder and negative electrode active material powder. It was confirmed that the composition of these produced powder was $Li_3V_2(PO_4)_3$ using an X-ray diffractometer.
(Production of Paste for Positive Electrode Active Material Layer and Paste for Negative Electrode Active Material Layer)

Regarding a paste for a positive electrode active material layer and a paste for a negative electrode active material layer, 15 parts of ethyl cellulose as a binder and 65 parts of dihydroterpineol as a solvent were added to 100 parts of $Li_3V_2(PO_4)_3$ powder and the mixture was mixed with each other and dispersed to produce both a paste for a positive electrode active material layer and a paste for a negative electrode active material layer.
(Production of Paste for Solid Electrolyte Layer)

$Li_{1.3}Al_{0.3}Ti_{1.7}(PO_4)_3$ produced in the following method was used as a solid electrolyte. Regarding the production method, $Li_2CO_3$, $Al_2O_3$, $TiO_2$, and $NH_4H_2PO_4$ were used as starting materials, wet-mixed with each other with a ball mill for 16 hours, and then, subjected to dehydration and drying. Subsequently, the obtained powder was fired in atmospheric air at 800° C. for 2 hours. After the firing, the resultant was subjected to dehydration and drying with a ball mill for 16 hours and was then subjected to dehydration and drying to obtain solid electrolyte powder. It was confirmed that the composition of the prepared powder was $Li_{1.3}Al_{0.3}Ti_{1.7}(PO_4)_3$ using an X-ray diffractometer (XRD).

Subsequently, ethanol 100 parts and toluene 200 parts were added to this powder as solvents to perform wet-mixing with a ball mill. Thereafter, 16 parts of polyvinyl butyral binder and 4.8 parts of benzyl butyl phthalate were further added thereto and the mixture was mixed to prepare a paste for a solid electrolyte layer.
(Production of Sheet for Solid Electrolyte Layer)

A sheet was formed using a PET film as a base material through a doctor blade method using a paste for a solid electrolyte layer to obtain a sheet for a solid electrolyte layer having a thickness of 15 μm.
(Production of Paste for Positive Electrode Current Collector Layer and Paste for Negative Electrode Current Collector Layer)

Cu and $Li_3V_2(PO_4)_3$ were mixed with each other as a positive electrode current collector and a negative electrode current collector so as to have a volume ratio of 80/20. Then, 10 parts of ethyl cellulose as a binder and 50 parts of dihydroterpineol as a solvent were added thereto, and the mixture was mixed with each other and dispersed to produce a paste for a positive electrode current collector layer and a paste for a negative electrode current collector layer.
(Production of Paste for Margin Layer)

Regarding a paste for a margin layer, 100 parts of ethanol and 100 parts of toluene were added to $Li_{1.3}Al_{0.3}Ti_{1.7}(PO_4)_3$ powder as solvents, the mixture was wet-mixed with a ball mill, 16 parts of a polyvinyl butyral binder and 4.8 parts of benzyl butyl phthalate were then further added thereto, and the mixture was mixed with each other to produce a paste for a margin layer.
(Production of External Electrode Paste)

Silver powder, an epoxy resin, and a solvent were mixed with each other and dispersed to produce a thermosetting external electrode paste.

These pastes were used to produce an all-solid-state battery as follows.
(Production of Positive Electrode Layer Unit)

A positive electrode active material layer having a thickness of 5 μm was formed on a sheet for a solid electrolyte layer using the printing pattern of FIG. 4 through screen printing and dried at 80° C. for 10 minutes. Next, a positive electrode current collector layer having a thickness of 5 μm was formed thereon using the same printing pattern through screen printing and dried at 80° C. for 10 minutes. Furthermore, a positive electrode active material layer having a thickness of 5 μm was formed thereon again using the same printing pattern through screen printing and dried at 80° C. for 10 minutes to produce a positive electrode layer on the sheet for a solid electrolyte layer. Subsequently, a margin layer having subsequently the same height as that of the positive electrode layer on the plane was formed on the outer circumference of one end of the positive electrode layer through screen printing and dried at 80° C. for 10 minutes. Subsequently, the PET film was peeled off to obtain a positive electrode layer unit sheet. Printing was performed by adjusting the lengths of a length X (length La on the first side surface 23), a width Y, and one end (length $L_1$ of the positive electrode auxiliary portion 302 on the first side surface 23) of the positive electrode layer extending to the side surface in the printing pattern to 5,000 μm, 3,500 μm, and 10 μm after respective firing.
(Production of Negative Electrode Layer Unit)

A negative electrode active material layer having a thickness of 5 μm was formed on the sheet for a solid electrolyte layer using the printing pattern of FIG. 5 through screen printing and dried at 80° C. for 10 minutes. Next, a negative electrode current collector layer having a thickness of 5 μm was formed thereon using the same printing pattern through screen printing and dried at 80° C. for 10 minutes. Furthermore, a negative electrode active material layer having a thickness of 5 μm was formed thereon again using the same printing pattern through screen printing and dried at 80° C. for 10 minutes to produce a negative electrode layer on the sheet for a solid electrolyte layer. Subsequently, a margin layer having subsequently the same height as that of the negative electrode layer on the plane was formed on the outer circumference of one end of the negative electrode layer through screen printing and dried at 80° C. for 10 minutes. Subsequently, the PET film was peeled off to obtain a negative electrode layer unit sheet. Printing was performed by adjusting a length X (length $L_3$ on the first side surface 23), a width Y, and one end (length $L_2$ of the negative electrode auxiliary portion 402 on the first side surface 23) of the negative electrode layer extending to the side surface in the printing pattern to 5,000 μm, 3,500 μm, and 10 μm after respective firing.
(Production of Laminate)

A plurality of positive electrode layer units and negative electrode layer units were laminated while offsetting the units so that one end of each unit does not match to produce a laminated substrate. Furthermore, a plurality of solid electrolyte sheets were laminated on both main surfaces of the laminated substrate as outer layers. The outer layers were adjusted so as to have a thickness of 500 μm after firing of the laminate. Subsequently, the laminate was thermocompression-bonded with a die press, and was then cut to produce a non-fired laminate of an all-solid-state battery. Subsequently, the laminate was debindered and fired to obtain a laminate of an all-solid-state battery. Regarding the firing, the temperature was raised to a firing temperature of 850° C. at a rate of temperature increase of 200° C./hour in nitrogen and held at the temperature for 2 hours, and the laminate was taken out after natural cooling.
(Step of Forming External Electrode)

An external electrode paste was applied to a positive electrode and a negative electrode exposed to both side surfaces and both end surfaces of the laminate of the all-solid-state battery so that the positive electrode and the negative electrode was covered, and was thermally cured at 150° C. for 30 minutes to form a pair of external electrodes.

Examples 2 to 10

All-solid-state batteries of Examples 2 to 10 were produced in the same manner as in Example 1 except that the lengths of $L_1$ and $L_2$ were adjusted as shown in Table 1 in the production of a positive electrode layer unit and a negative electrode layer unit.

Examples 11 to 13

All-solid-state batteries of Examples 11 to 13 were produced in the same manner as in Example 1 except that the lengths of $L_1$ and $L_2$ were adjusted as shown in Table 1 so that the lengths were different from each other in the production of a positive electrode layer unit and a negative electrode layer unit. The all-solid-state battery according to Example 12 had the same structure as that in the related art only in the production of a negative electrode layer unit, that is a structure including no negative electrode auxiliary portion 402 (structure corresponding to the second embodiment).

Comparative Examples 1 and 2

An all-solid-state battery of Comparative Example 1 was produced in the same manner as in Example 1 except that the lengths of $L_1$ and $L_2$ were adjusted as shown in Table 1. An all-solid-state battery of Comparative Example 2 was produced in the same manner as in Example 1 except that neither a positive electrode auxiliary portion 302 nor a negative electrode auxiliary portion 402 was provided in the production of a positive electrode layer unit and a negative electrode layer unit. The electrode area contributing to a facing charge-discharge reaction between a positive electrode and a negative electrode was the same as that of the all-solid-state batteries according to other examples, and the charge-discharge capacity did not change.

(Evaluation of Battery)

The all-solid-state batteries produced in these examples and comparative examples can be evaluated for the following battery characteristics.

[Charge-Discharge Cycle Test]

The all-solid-state batteries produced in these examples and comparative examples can be evaluated for charge-discharge cycle characteristics, for example, under charge-discharge conditions shown below. Hereafter, C-rate will be used to notate a charge-discharge current. C-rate is notated as nC (µA) (n is a numerical value) and means a current capable of charging and discharging nominal capacity (µAh) at 1/n (h). For example, 1C means a charge-discharge current capable of charging nominal capacity in 1 h and 2C means a charge-discharge current capable of charging nominal capacity in 0.5 h. For example, in a case of an all-solid-state battery having nominal capacity of 100 µAh, the current of 0.1C is 10 µA (calculation equation being 100 µA×0.1=10 µA). Similarly, the current of 0.2C is 20 µA and the current of 1C is 100 µA.

Regarding the conditions of the charge-discharge cycle test, constant current charging (CC charging) was performed in an environment of 25° C. at a constant current of 0.2C-rate until the battery voltage reached 1.6 V, and then, discharging (CC discharging) was performed at a constant current of 0.2C-rate until the battery voltage reached 0 V. The charging and discharging were regarded as one cycle, and the discharge capacity retention rate after repeating this cycle up to 1,000 times was evaluated as charge-discharge cycle characteristics. The charge-discharge cycle characteristics in the present embodiment were calculated using the following calculation equation.

Discharge capacity retention rate (%) after 1,000 cycles=(discharge capacity after 1,000 cycles÷discharge capacity after 1 cycle)×100

(Results)

Results of the cycle characteristics of the all-solid-state batteries according to Examples 1 to 13 and Comparative Examples 1 and 2 are shown in Table 1. The results were that the all-solid-state batteries according to Examples 2 to 10 had superior cycle characteristics than the all-solid-state batteries according to the comparative examples. This is because at least one of a positive electrode and a negative electrode had a positive electrode auxiliary portion or a negative electrode auxiliary portion, and the positive electrode and the negative electrode including these were bonded to external electrodes. In addition, if the sum of the lengths of the length $L_1$ of the positive electrode auxiliary portion 302 and the length $L_2$ of the negative electrode auxiliary portion 402 on the first side surface 23 was less than 100% and greater than or equal to 60 µm in the longitudinal direction of the side surface of the laminate, the cycle characteristics were favorable. If the sum of the lengths of the length $L_1$ of the positive electrode auxiliary portion 302 and the length $L_2$ of the negative electrode auxiliary portion 402 was 100% (Comparative Example 1) with respect to the length $L_3$ of the first side surface 23, the external electrodes were short-circuited therebetween.

TABLE 1

|  | L3 [µm] | L1 [µm] | L2 [µm] | L1 + L2 [µm] | L1/L3 [%] | L2/L3 [%] | (L1/L3) + (L2/L3) [%] | Cycle characteristics (1000 cyc) | Short circuit rate [%] |
|---|---|---|---|---|---|---|---|---|---|
| Example 1 | 5000 | 10 | 10 | 20 | 0.2 | 0.2 | 0.4 | 77 | 0 |
| Example 2 | 5000 | 30 | 30 | 60 | 0.6 | 0.6 | 1.2 | 85 | 0 |
| Example 3 | 5000 | 50 | 50 | 100 | 1 | 1 | 2 | 88 | 0 |
| Example 4 | 5000 | 100 | 100 | 200 | 2 | 2 | 4 | 90 | 0 |
| Example 5 | 5000 | 250 | 250 | 500 | 5 | 5 | 10 | 91 | 0 |
| Example 6 | 5000 | 500 | 500 | 1000 | 10 | 10 | 20 | 92 | 0 |
| Example 7 | 5000 | 1250 | 1250 | 2500 | 25 | 25 | 50 | 93 | 0 |
| Example 8 | 5000 | 2000 | 2000 | 4000 | 40 | 40 | 80 | 93 | 0 |
| Example 9 | 5000 | 2250 | 2250 | 4500 | 45 | 45 | 90 | 93 | 0 |
| Example 10 | 5000 | 2450 | 2450 | 4900 | 49 | 49 | 98 | 93 | 0 |
| Example 11 | 5000 | 400 | 100 | 500 | 8 | 2 | 10 | 88 | 0 |

TABLE 1-continued

|  | L3 [μm] | L1 [μm] | L2 [μm] | L1 + L2 [μm] | L1/L3 [%] | L2/L3 [%] | (L1/L3) + (L2/L3) [%] | Cycle characteristics (1000 cyc) | Short circuit rate [%] |
|---|---|---|---|---|---|---|---|---|---|
| Example 12 | 5000 | 500 | 0 | 500 | 10 | 0 | 10 | 88 | 0 |
| Example 13 | 5000 | 4000 | 500 | 4500 | 80 | 10 | 90 | 86 | 0 |
| Comparative Example 1 | 5000 | 2500 | 2500 | 5000 | 50 | 50 | 100 | 0 | 100 |
| Comparative Example 2 | 5000 | 0 | 0 | 0 | 0 | 0 | 0 | 70 | 0 |

Although the present invention has been described in detail above, the above-described embodiments and the examples are merely examples, and the invention disclosed herein includes those obtained by variously modifying and changing the above-described specific examples.

REFERENCE SIGNS LIST

1 All-solid-state battery
20 Laminate
21 First end surface
22 Second end surface
23 First side surface
24 Second side surface
30 Positive electrode
31 Positive electrode current collector layer
32 Positive electrode active material layer
40 Negative electrode
41 Negative electrode current collector layer
42 Negative electrode active material layer
50 Solid electrolyte layer
60 Positive electrode-side external electrode
70 Negative electrode-side external electrode
80 Margin layer

What is claimed is:

1. An all-solid-state battery comprising:
a laminate;
a positive electrode-side external electrode; and
a negative electrode-side external electrode,
wherein the laminate includes a positive electrode layer, a negative electrode layer, and a solid electrolyte layer between the positive electrode layer and the negative electrode layer,
wherein the positive electrode-side external electrode is connected to the positive electrode layer on a positive electrode-side end surface of the laminate,
wherein the negative electrode-side external electrode is connected to the negative electrode layer on a negative electrode-side end surface of the laminate,
wherein the positive electrode layer includes a positive electrode main portion extending from the positive electrode-side end surface to the negative electrode-side end surface and a positive electrode auxiliary portion which protrudes from the positive electrode main portion along the positive electrode-side end surface and reaches a side surface intersecting the positive electrode-side end surface in a plan view from a lamination direction of the laminate,
wherein the negative electrode layer includes a negative electrode main portion extending from the negative electrode-side end surface to the positive electrode-side end surface and a negative electrode auxiliary portion which protrudes from the negative electrode main portion along the negative electrode-side end surface and reaches the side surface intersecting the positive electrode-side end surface from the negative electrode main portion in the plan view from the lamination direction of the laminate, and
wherein, when viewed in the plan view from the lamination direction, a length $L_1$ of the positive electrode auxiliary portion on the side surface, a length $L_2$ of the negative electrode auxiliary portion on the side surface, and a length $L_3$ of the side surface satisfy a relation below $$20 \, \mu m \leq (L_1 + L_2) < L_3 \qquad (1).$$

2. The all-solid-state battery according to claim 1, wherein, when viewed in a plan view from the lamination direction, a length $L_1$ of the positive electrode auxiliary portion on the side surface, a length $L_2$ of the negative electrode auxiliary portion on the side surface, and a length $L_3$ on the side surface satisfy a relation below $$60 \, \mu m \leq (L_1 + L_2) < L_3 \qquad (2).$$

3. The all-solid-state battery according to claim 1, wherein the length $L_1$ of the positive electrode auxiliary portion on the side surface is the same as the length $L_2$ of the negative electrode auxiliary portion on the side surface.

4. The all-solid-state battery according to claim 1, wherein the length $L_1$ of the positive electrode auxiliary portion on the side surface and the length $L_3$ on the side surface satisfy a relation below $$(L_3 \times 2\%) \leq L_1 \leq (L_3 \times 49\%) \qquad (3).$$

5. The all-solid-state battery according to claim 1, wherein the length $L_2$ of the negative electrode auxiliary portion on the side surface and the length $L_3$ on the side surface satisfy a relation below $$(L_3 \times 2\%) \leq L_2 \leq (L_3 \times 49\%) \qquad (4).$$

6. The all-solid-state battery according to claim 2, wherein the length $L_1$ of the positive electrode auxiliary portion on the side surface is the same as the length $L_2$ of the negative electrode auxiliary portion on the side surface.

7. The all-solid-state battery according to claim 2, wherein the length $L_1$ of the positive electrode auxiliary portion on the side surface and the length $L_3$ on the side surface satisfy a relation below $$(L_3 \times 2\%) \leq L_1 \leq (L_3 \times 49\%) \qquad (3).$$

8. The all-solid-state battery according to claim 3, wherein the length $L_1$ of the positive electrode auxiliary portion on the side surface and the length $L_3$ on the side surface satisfy a relation below $$(L_3 \times 2\%) \leq L_1 \leq (L_3 \times 49\%) \qquad (3).$$

9. The all-solid-state battery according to claim 6, wherein the length $L_1$ of the positive electrode auxiliary portion on the side surface and the length $L_3$ on the side surface satisfy a relation below $$(L_3 \times 2\%) \leq L_1 \leq (L_3 \times 49\%) \quad (3).$$

10. The all-solid-state battery according to claim 2, wherein the length $L_2$ of the negative electrode auxiliary portion on the side surface and the length $L_3$ on the side surface satisfy a relation below $$(L_3 \times 2\%) \leq L_2 \leq (L_3 \times 49\%) \quad (4).$$

11. The all-solid-state battery according to claim 3, wherein the length $L_2$ of the negative electrode auxiliary portion on the side surface and the length $L_3$ on the side surface satisfy a relation below $$(L_3 \times 2\%) \leq L_2 \leq (L_3 \times 49\%) \quad (4).$$

12. The all-solid-state battery according to claim 4, wherein the length $L_2$ of the negative electrode auxiliary portion on the side surface and the length $L_3$ on the side surface satisfy a relation below $$(L_3 \times 2\%) \leq L_2 \leq (L_3 \times 49\%) \quad (4).$$

13. The all-solid-state battery according to claim 6, wherein the length $L_2$ of the negative electrode auxiliary portion on the side surface and the length $L_3$ on the side surface satisfy a relation below $$(L_3 \times 2\%) \leq L_2 \leq (L_3 \times 49\%) \quad (4).$$

14. The all-solid-state battery according to claim 7, wherein the length $L_2$ of the negative electrode auxiliary portion on the side surface and the length $L_3$ on the side surface satisfy a relation below $$(L_3 \times 2\%) \leq L_2 \leq (L_3 \times 49\%) \quad (4).$$

15. The all-solid-state battery according to claim 8, wherein the length $L_2$ of the negative electrode auxiliary portion on the side surface and the length $L_3$ on the side surface satisfy a relation below $$(L_3 \times 2\%) \leq L_2 \leq (L_3 \times 49\%) \quad (4).$$

16. The all-solid-state battery according to claim 9, wherein the length $L_2$ of the negative electrode auxiliary portion on the side surface and the length $L_3$ on the side surface satisfy a relation below $$(L_3 \times 2\%) \leq L_2 \leq (L_3 \times 49\%) \quad (4).$$

17. The all-solid-state battery according to claim 1, wherein
the positive electrode auxiliary portion is in direct contact with the positive electrode-side end surface of the laminate, and
the negative electrode auxiliary portion is in direct contact with the negative electrode-side end surface of the laminate.

* * * * *